(12) United States Patent
Ohishi et al.

(10) Patent No.: US 6,665,055 B2
(45) Date of Patent: Dec. 16, 2003

(54) LIGHT-WAVE RANGEFINDER USING A PULSE METHOD

(75) Inventors: Masahiro Ohishi, Tokyo (JP); Yoshikatsu Tokuda, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 0 days.

(21) Appl. No.: 10/320,234

(22) Filed: Dec. 16, 2002

(65) Prior Publication Data

US 2003/0142287 A1 Jul. 31, 2003

(30) Foreign Application Priority Data

Dec. 18, 2001 (JP) ........................................ 2001-385317

(51) Int. Cl.[7] ............................. G01C 3/08; G01S 13/08
(52) U.S. Cl. ...................... 356/5.01; 342/135; 342/203
(58) Field of Search ............................. 356/5.01–5.08; 342/134, 135, 203, 202, 204

(56) References Cited

U.S. PATENT DOCUMENTS

| 4,639,129 A | * | 1/1987 | Hullein et al. | |
| 5,150,125 A | * | 9/1992 | Hager | |
| 5,157,403 A | * | 10/1992 | Urkowitz | |
| 5,619,317 A | * | 4/1997 | Oishi et al. | 356/5.05 |

* cited by examiner

Primary Examiner—Stephen C. Buczinski
(74) Attorney, Agent, or Firm—Baker Botts LLP

(57) ABSTRACT

The present invention relates to a light-wave rangefinder using a pulse method, which can reduce a measurement error, in which a tuned amplifier converts an electric signal of a light receiving unit into a damped oscillation waveform and thereby an arithmetic processing means can calculate a distance from a measuring position to a reflecting object on the basis of the damped oscillation waveform of the tuned amplifier. An optical noise sampling unit samples an optical noise produced in the rangefinder; an optical-noise storage unit stores sampling data of the optical-noise sampling unit; an arithmetic processing means reduces a measurement error caused by an optical noise on the basis of the sampling data of the optical-noise storage unit; and thereby a distance, a measurement error of which is reduced, can be calculated.

2 Claims, 9 Drawing Sheets

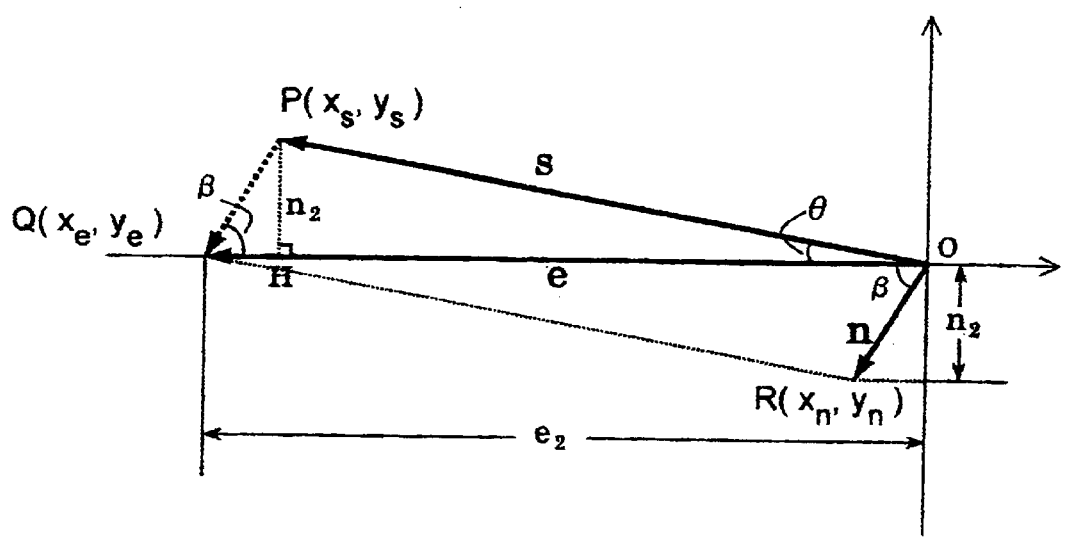
F I G. 7

LIGHT-WAVE RANGEFINDER USING A PULSE METHOD

BACKGROUND OF THE INVENTION

The present invention relates to a light-wave rangefinder using a pulse method, and more particularly to a light-wave rangefinder using a pulse method, which detects an optical noise generated as internal reflection of a main body of the light-wave rangefinder to store the optical noise as optical noise data, and which uses the optical noise data to correct distance measuring data so that a measurement error is reduced.

The light-wave rangefinder using a pulse method developed in recent years is capable of non-prism distance measuring. To be more specific, the light-wave rangefinder can measure a distance using light reflected from a target to be measured itself without using a reflection device, such as a prism, as a target to be measured. The non-prism distance measuring includes the following: receiving feeble reflected light, which is reflected by the surface of a target to be measured, to perform distance measuring; and emitting pulsed light with high peak power, and receiving reflected light, which is reflected by the surface of a target to be measured itself, to perform distance measuring.

The received reflected light is converted into an electric signal, and then various kinds of processing for calculation of a distance is performed according to the electric signal. Therefore, the reflected light is received and converted into an electric signal in various methods that are considered so that a stable signal can always be obtained regardless of disturbance.

Here, one of methods for obtaining a stable signal will be described with reference to FIG. 9. Pulsed light (a) emitted from a light-wave rangefinder is reflected by a target to be measured, and is delayed by a period of time in response to a distance from the light-wave rangefinder to the target to be measured before the pulsed light is received as reflected pulsed light (b) by a light receiving element. A tuned amplifier changes a waveform of the reflected pulsed light (b), which has been received, to a damped oscillation waveform (c). This damped oscillation waveform can be obtained by setting Q of the tuned amplifier properly. This method has an advantage mentioned below. Even if a peak value of the reflected pulsed light (b) changes owing to fluctuations in the air, so long as a position of its center of gravity remains unchanged, a zero-crossing point of the damped oscillation waveform (c) does not change. Therefore, using this zero-crossing point as reference timing of distance measuring operation enables accurate measurement.

By the way, the longest distance to be measured in the non-prism distance measuring by a light-wave rangefinder using a pulse method tends to become greater year-by-year.

Examples of methods for increasing a measurable distance of the non-prism distance measuring include emitting light with higher peak power; and increasing light-receiving sensitivity to improve efficiency in light receiving of feeble reflected light. However, this poses a problem that feeble optical noise, which is reflected by the surface of an optical member used in the light-wave rangefinder, is also received simultaneously. This optical noise causes a measurement error when measuring a short distance. In particular, the influence is large when the non-prism distance measuring is used, which is a serious problem.

Next, the influence of an optical noise exerted upon distance measuring operation will be described with reference to FIG. 10. As shown in FIG. 10(a), if reflected light is received immediately after an optical noise is received, a damped oscillation waveform which is generated from the optical noise and the reflected light has a shape as shown in FIG. 10(b). Accordingly, as shown in FIG. 10(c), the damped oscillation waveform, which is actually observed, becomes a waveform into which a damped oscillation waveform of the optical noise and a damped oscillation waveform of the reflected light are combined. As a result, the following problem arises: the influence of the optical noise causes a slight phase shift of a zero-crossing point of this combined damped oscillation waveform, which produces an error in measured distance.

Therefore, conventionally, there were the following serious problems: adjustment for eliminating the influence of the optical noise must be performed at the time of factory shipment, which requires much labor and hinders an improvement in productivity. The prior art shown in FIG. 11 includes a crystal oscillator 100, a first frequency divider 110, a synthesizer 120, a second frequency divider 130, a third frequency divider 140, a luminous element 1, a luminous element driver 150, a light receiving element 71, an amplifier 160, a zero-crossing detecting circuit 165, a waveform shaping circuit 170, a counter 180, a peak-hold circuit 190, a level judging circuit 200, a band-pass filter 210, a sample hold (S/H) 220, an arithmetic processing circuit 1000, and an optical-noise nonvolatile memory 620.

The prior art is so devised that adjustment for eliminating the influence of an optical noise is performed at the time of factory shipment, and then data is stored in the optical-noise nonvolatile memory 620. In this connection, since the other configurations will be described in embodiments mentioned below, the description will be omitted here.

SUMMARY OF THE INVENTION

According to one aspect of the present invention there is provided a light-wave rangefinder using a pulse method, which can reduce a measurement error. In the light-wave rangefinder, an optical noise sampling unit samples an optical noise produced in the rangefinder; an optical-noise storage unit stores sampling data of the optical-noise sampling unit; and an arithmetic processing means reduces a measurement error, which is caused by an optical noise, on the basis of the sampling data of the optical-noise storage unit, and thereby a distance, a measurement error of which is reduced, can be calculated.

BRIEF DESCRIPTION OF THE DRAWINGS

Other objects and advantages of the invention will become apparent from the following description of embodiments with reference to the accompanying drawings in which:

FIG. 7 is a diagram illustrating principles of the present invention;

DESCRIPTION OF THE PREFERRED EMBODIMENTS

Embodiments of the present invention will be described with reference to drawings as below.

[Principles of the Invention]

This noise correction method utilizes the fact that a waveform obtained by a tuned amplifier is a damped oscillation waveform which oscillates at specific time intervals.

Figure 4:
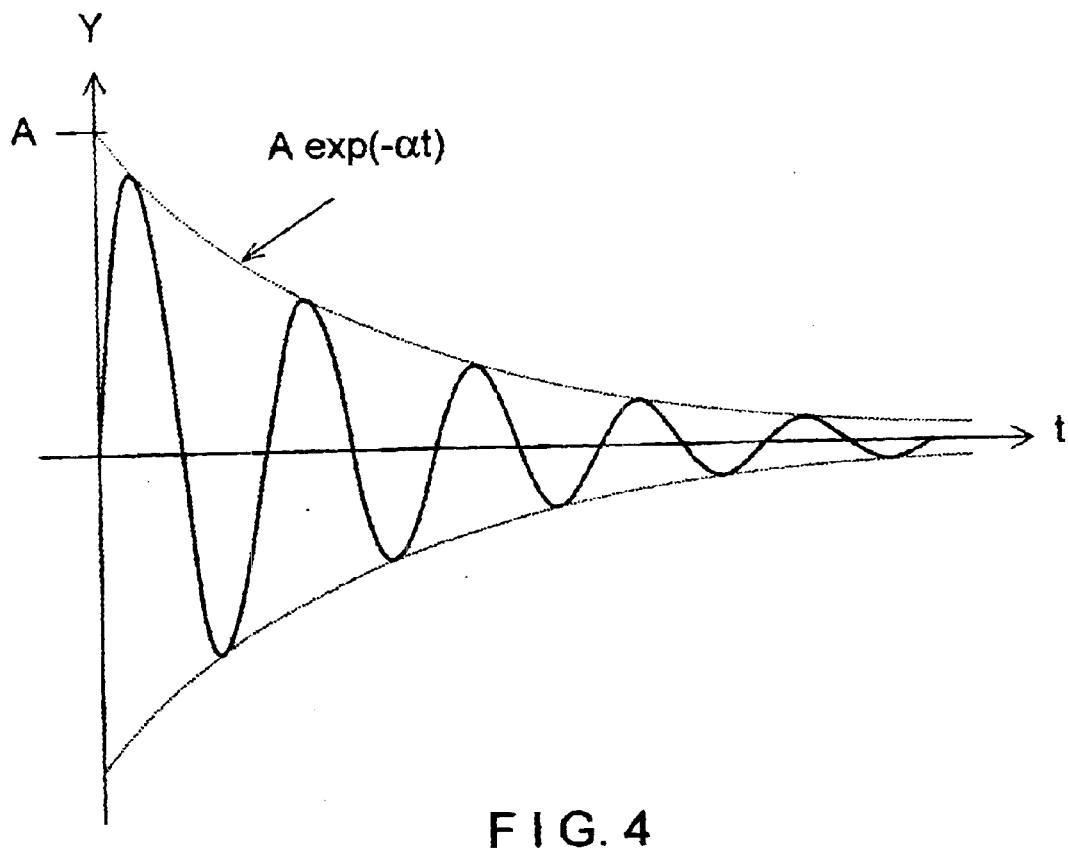
FIG. 4 is a diagram illustrating principles of the present invention.
Figure 5A:
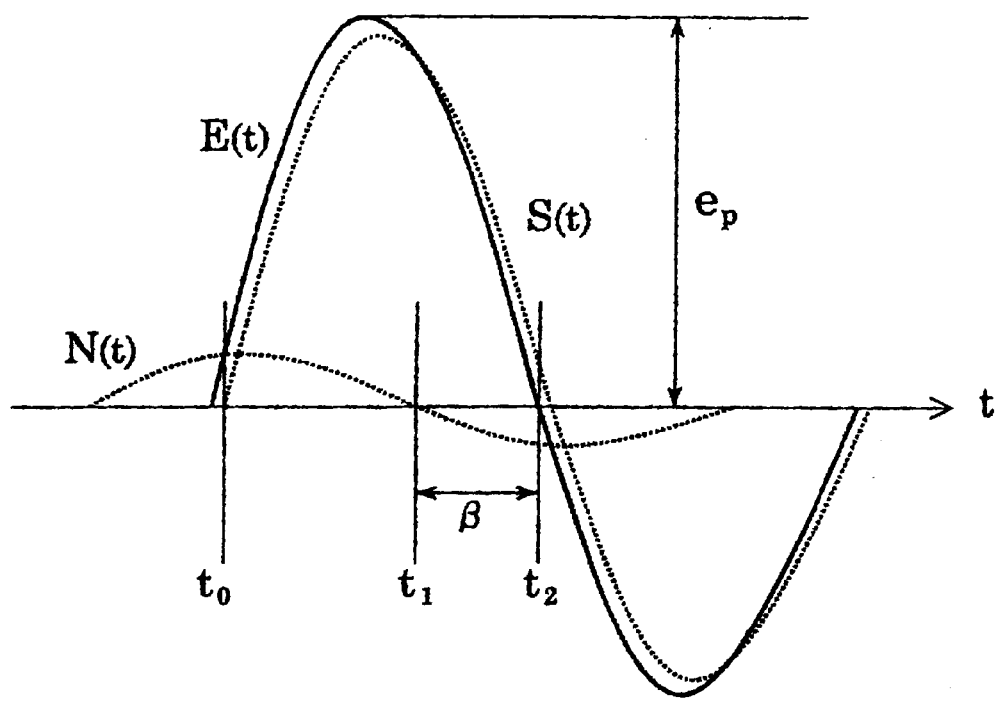
FIG. 5 is a diagram illustrating principles of the present invention.
Figure 5B:
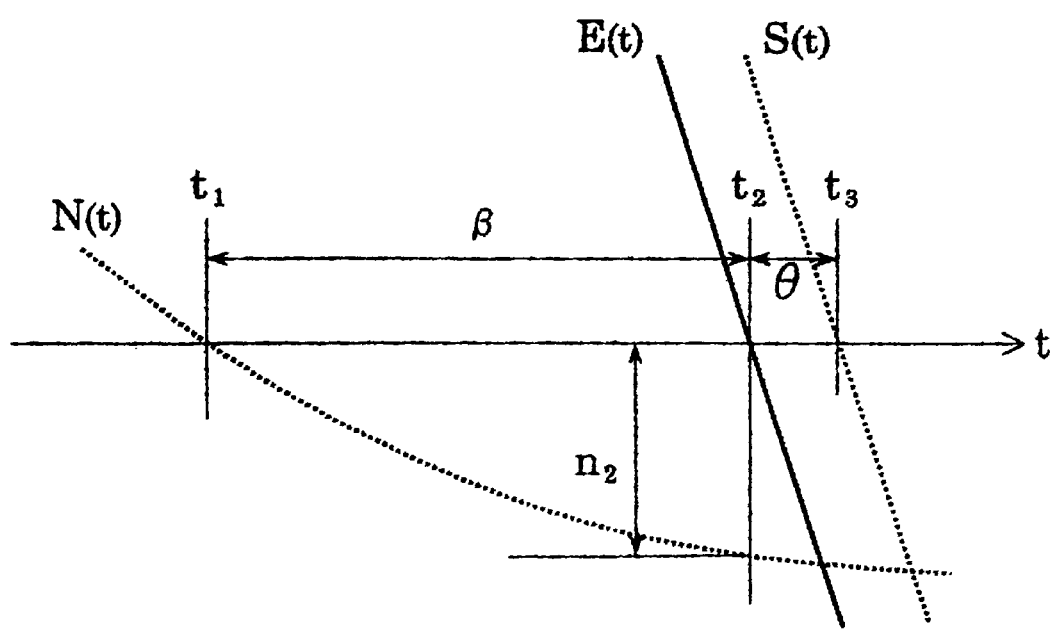

If the damped oscillation waveform is expressed in a numerical formula, the following equation is given in general.

$$Y(t) = A \times \exp(-\alpha t) \times \sin(2\pi f t) \quad \text{(First equation)}$$

where f is a frequency, and $A \times \exp(-\alpha t)$ is the size. This is a sine curve that decreases exponentially. If this waveform is illustrated as a graph, FIG. 4 is obtained. In the figure, an envelope of an oscillation waveform is expressed by $A \times \exp(-\alpha t)$ FIG. 5(a) illustrates a damped oscillation waveform N (t) by noise light; a damped oscillation waveform S (t) by reflected light; and an actually observed waveform E (t) into which N (t) and S (t) are combined. FIG. 5(b) is an enlarged illustration of an area in the vicinity of zero crossing.

A damped oscillation waveform is generated by a tuned amplifier circuit. Its frequency is predetermined by a circuit constant. Accordingly, a frequency of the damped oscillation waveform N (t) by noise light is the same as that of the damped oscillation waveform S (t) by reflected light. In addition, how to damp a waveform is also the same. Judging from the above, in general, the damped oscillation waveform N (t) by noise light, the damped oscillation waveform S (t) by reflected light, and the actually observed waveform E (t) into which N (t) and S (t) are combined, can be expressed by the following equations:

$$S(t) = S \times \exp(-\alpha t) \times \sin(2\pi f t) \quad \text{(Second Equation)}$$

$$N(t) = N \times \exp(-\alpha t) \times \sin(2\pi f t + \phi) \quad \text{(Third Equation)}$$

$$E(t) = E \times \exp(-\alpha t) \times \sin(2\pi f t + \phi)$$

$$= S(t) + N(t)$$

$$= S \times \exp(-\alpha t) \times \sin(2\pi f t) + N \times \exp(-\alpha t) \times \sin(2\pi f t + \phi) \quad \text{(Fourth equation)}$$

Here, $\alpha$ is a damping constant, which shows the extent to which a waveform is damped, and f is an oscillation frequency. Additionally, $\phi$ is a phase difference of noise light relative to reflected light. In a similar manner, $\theta$ is a phase difference of an actually observed waveform relative to reflected light.

At the time of the measurement, a zero-crossing point $t_2$ of the actually observed waveform E (t) is utilized as a timing signal. However, as shown in FIG. 5 (b), a zero-crossing point of the waveform S (t) formed by only reflected light which does not include noise is $t_3$. Accordingly, a phase of the actually observed waveform shifts by $\theta$. This phase shift $\theta$ becomes an error in distance measuring.

Figure 6A:
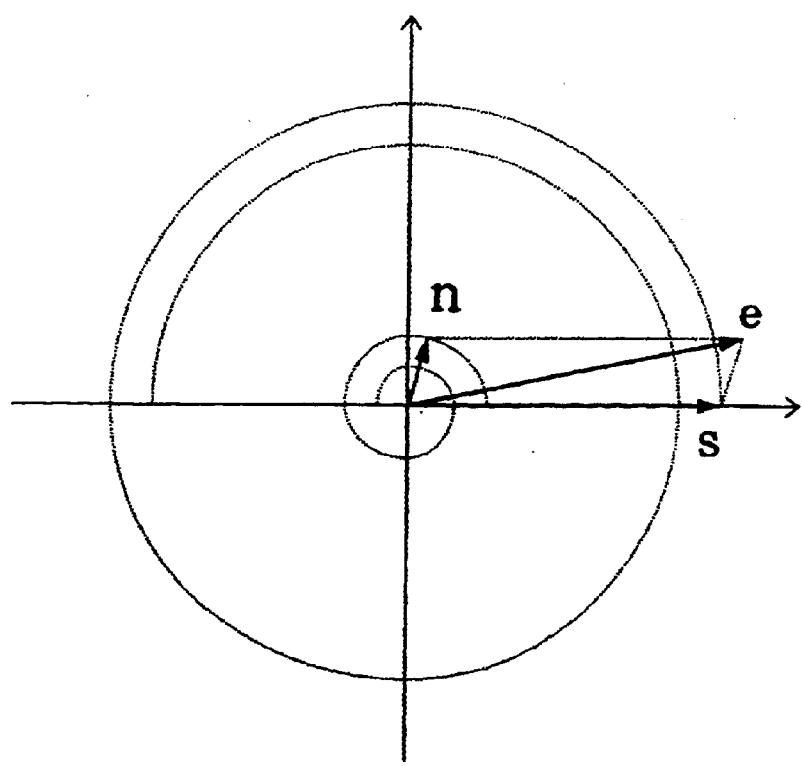
FIG. 6 is a diagram illustrating principles of the present invention.
Figure 6B:
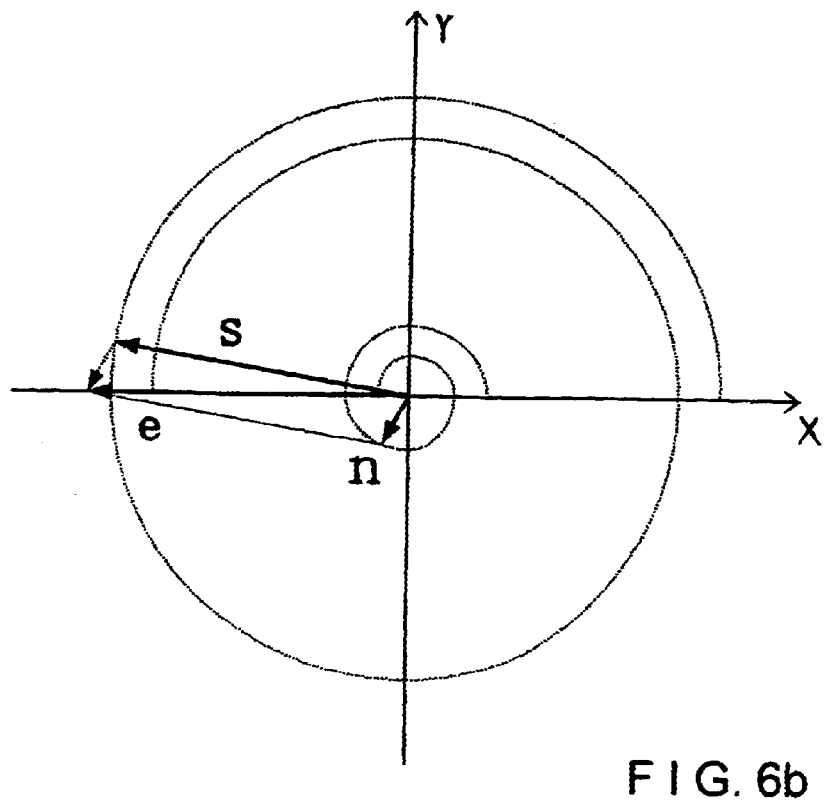
Figure 9:
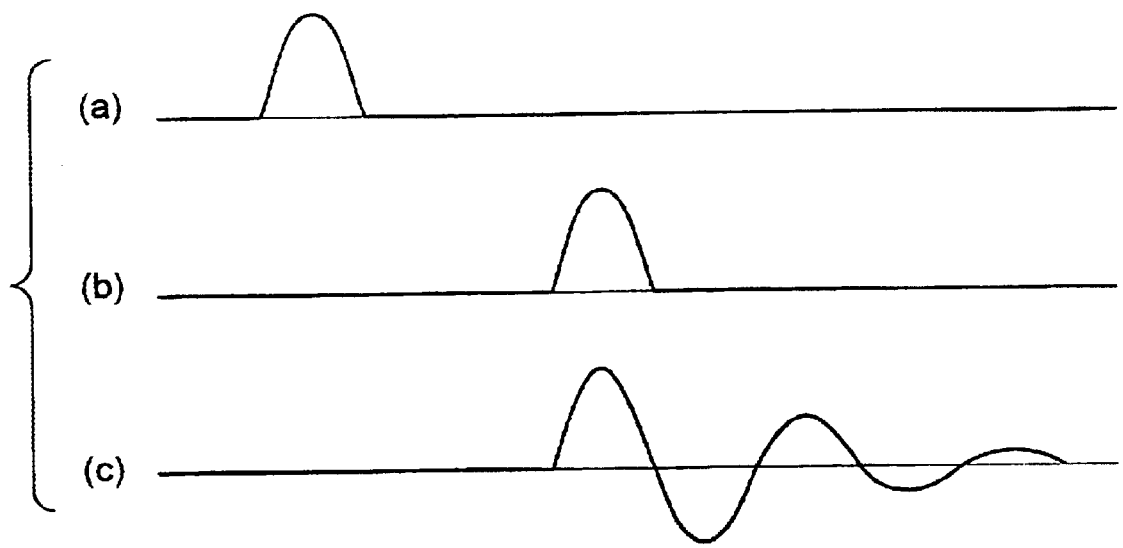
FIG. 9 is a diagram illustrating the prior art.
Figure 10:
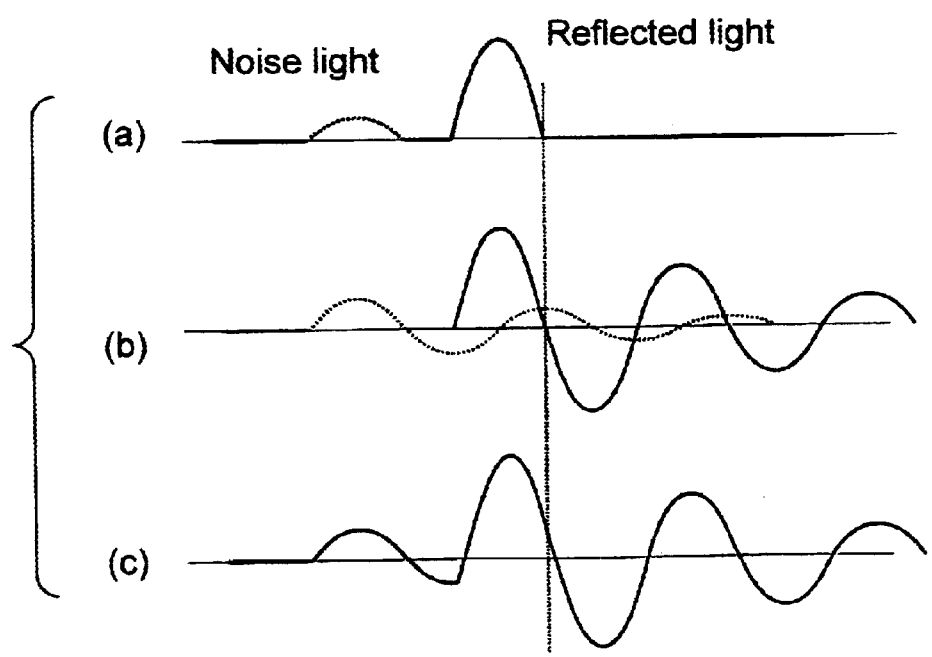
FIG. 10 is a diagram illustrating the prior art.
Figure 11:
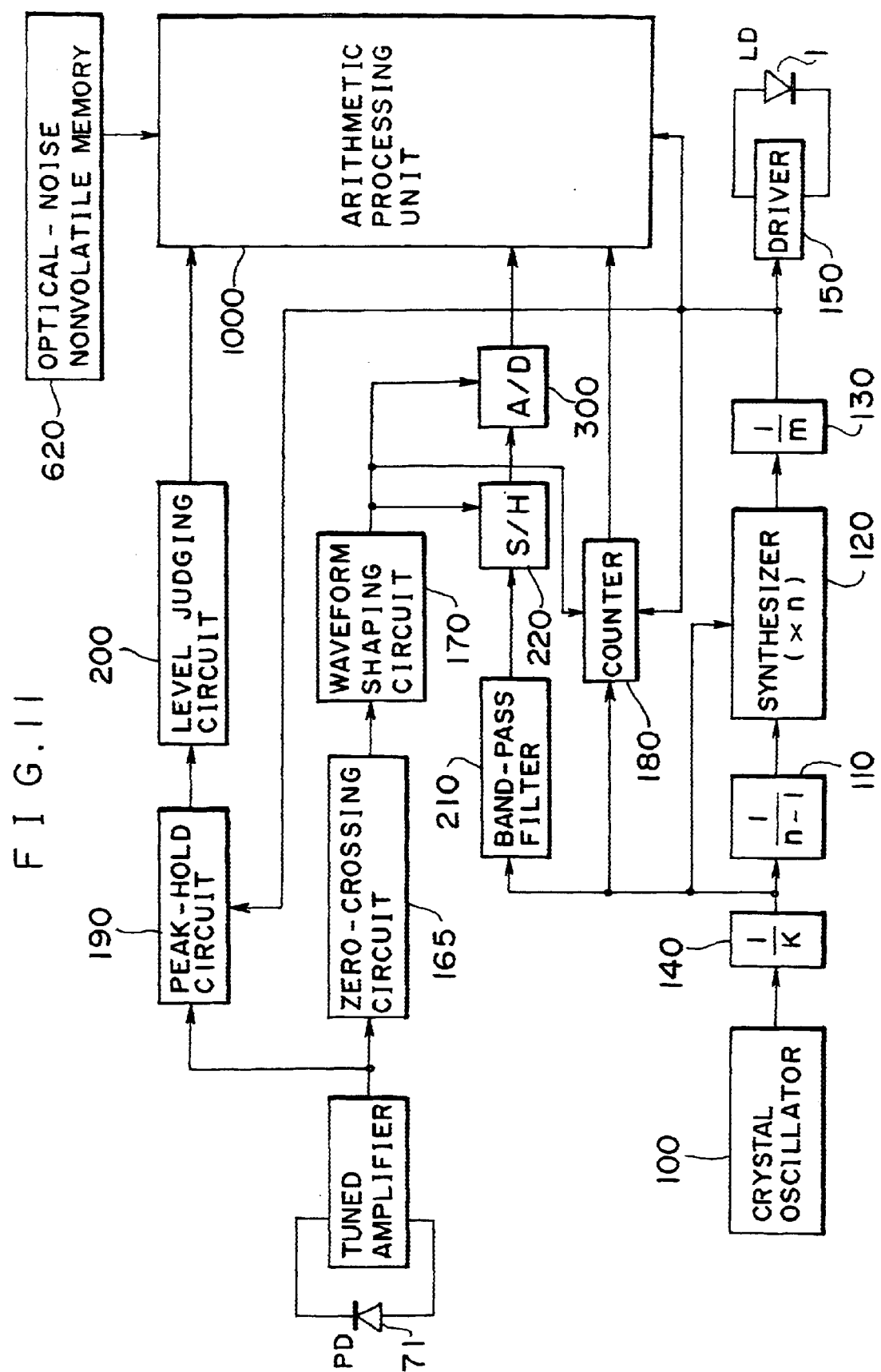
FIG. 11 is a diagram illustrating the prior art.

FIG. 6 illustrates relationships among three waveforms, which are shown in FIG. 5, using rotation vectors. FIG. 6(a) illustrates a state at time $t_0$ in FIG. 5. FIG. 6(b) illustrates a state at time $t_2$ in FIG. 5.

Assuming that vectors of N(t), S(t), E(t) are n, s, e, respectively, both of N(t) and S(t) are damped waveforms. Therefore, the vectors n, s rotates counterclockwise in such a manner as to trace a spiral in the figure with time.

In addition, the angle which the vector n forms with the vector s is $\phi$. This angle is always constant regardless of time. The vector e of the actually observed waveform E (t) is illustrated as the vector e in the figure, which is a composite vector of vectors n, s.

Here, the relationships among the vectors at time $t_2$, which are shown in FIG. 6(b), will be described in detail with reference to FIG. 7.

In FIG. 7, the angle $\theta$ which the vector e of an actually observed signal forms with the vector s of reflected light is a determined value.

Now, the following assumptions are made: a phase difference of the vector s relative to the vector e is $\theta$, and a phase difference of the vector n relative to the vector e is $\beta$; if both of them go ahead of the vector e, it is a plus angle, and if both of them remain backward, it is a minus angle; and coordinates of a point P are (Xs, Ys), coordinates of a point Q are (Xe, Ye), and coordinates of a point R are (Xn, Yn). This figure illustrates a state in which the actually observed waveform E(t) has just crossed a zero level. Therefore, coordinates (Xe, Ye) of the point Q become (Xe, 0). Further, coordinates (Xn, Yn) of the point R can be expressed as (Yn×cot $\beta$, Yn) using $\beta$.

Here, because the vector e is a composition of the vector s and the vector n, coordinates (Xs, Ys) of the point P can be expressed as below.

$$(Xs, Ys) = (Xe, Ye) - (Xn, Yn) = (Xe - Yn \times \cot \beta, -Yn) \quad \text{(Fifth Equation)}$$

As a result, a general equation for determining an angle $\theta$ can be derived as below.

$$\tan(180°+\theta) = (Ys/Xs) = (-Yn/(Xe-Yn \times \cot \beta)) \quad \theta = \tan^{-1}(-Yn/(Xe-Yn \times \cot \beta)) \quad \text{(Sixth Equation)}$$

Accordingly, as shown in FIG. 7, in the case of $Yn=-n_2$, $Xe=-e_2$, $\beta>0$, the following equation is obtained.

$$\theta = \tan^{-1}(n_2/(-e_2+n_2 \times \cot \beta)) < 0 \quad \text{(Seventh equation)}$$

Therefore, it is found out that a signal which does not include an error is shorter than a signal which includes an actually observed error by a distance that corresponds to the angle $\theta$.

Here, physical concepts of $n_2$, $e_2$, and $\beta$, and procedural steps to use them to determine $\theta$, will be described with reference to FIG. 5.

Figure 8:
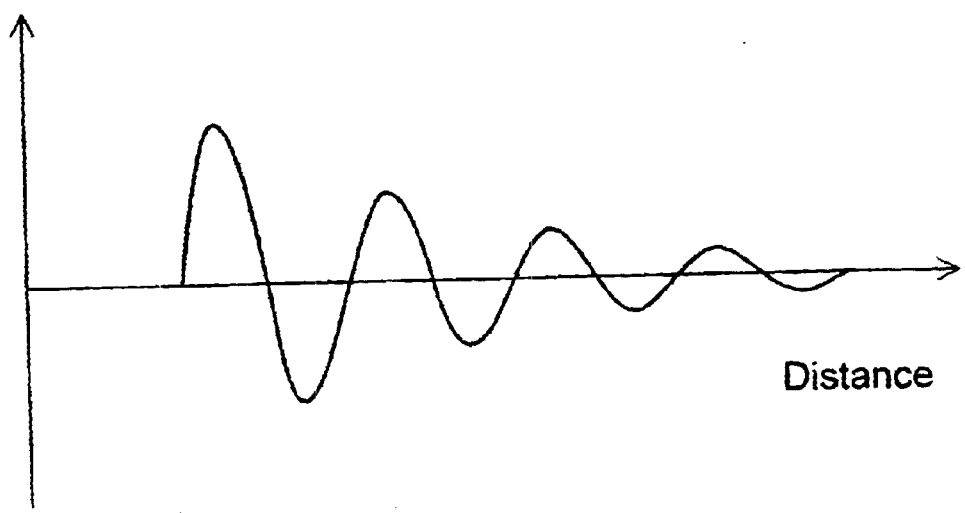
FIG. 8 is a diagram illustrating principles of the present invention.

To begin with, a state of optical noise is checked beforehand. A light-wave rangefinder main body emits pulsed light without aiming at a target to be measured. A damped oscillation waveform N(t) which is obtained at this time is sampled at given sampling intervals. Sampled data is stored in a non-volatile memory. In this case, if the sampled data is expressed in the form of a graph where a horizontal axis indicates an address and a vertical axis indicates a sample value, this data is expressed as the amount of noise versus distance as shown in FIG. 8.

As shown in FIG. 5(b), $n_2$ is a size of the optical noise $N(t_2)$ at time $t_2$ when an observed waveform E(t) which is actually observed crosses zero. A value of the time $t_2$ when the observed waveform E(t) crosses zero can be determined by a distance to the target to be measured, judging from the result of the distance measuring. Accordingly, it is possible to calculate a value $n_2$ of the waveform $N(t_2)$ at time $t_2$ using the damped oscillation waveform N(t) of noise light stored in a nonvolatile memory beforehand. However, if a light receiving unit is equipped with a density filter used for adjusting the quantity of received light, a value of the damped oscillation waveform N(t) is multiplied by a damping factor of the density filter at this time to determine $n_2$, which is the result of the multiplication.

As shown in FIGS. 5(a) and 5(b), $\beta$ is a phase difference between the actually observed waveform E(t) and the damped oscillation waveform N(t) by noise light. This value can also be calculated from a distance to an object, and the damped oscillation waveform N(t) of noise light stored beforehand.

The vector $e_2$ is a size of the vector e at time $t_2$ when the observed waveform E(t) crosses zero. As shown in FIG. 4, a size of a vector is just the size of an envelope of damped oscillation if its phase is not taken into consideration. Accordingly, the following equation holds.

$$e_2 = E\exp(-\alpha t_2) \qquad \text{(Ninth Equation)}$$

In this case, a value of E in the ninth equation is an initial value when t=0. This is a value that depends on the quantity of received light. Thus, when a value of the vector $e_2$ is calculated, it is necessary to determine a value of E every time distance is measured. To begin with, a damping constant $\alpha$ is calculated beforehand from a damped waveform of optical noise stored in a memory. The value of E cannot be determined directly from the actually observed waveform E(t). However, as shown in FIG. 5(a), the first peak value $e_p$ of an oscillation waveform can be obtained by a peak-hold circuit, etc.

On the assumption that the first peak appears at a position, a phase of which is 90 degrees on this side relative to $t_2$ of a zero-crossing point, the time $t_p$ is determined by calculation. Then, from a damping constant $\alpha$, a peak value $e_p$, and time $t_p$, which have been obtained, the value of E can be determined using the tenth equation.

$$E = e_p/\exp(-\alpha t_p) \qquad \text{(Tenth Equation)}$$

Strictly speaking, a position where the first peak value of damped oscillation appears slightly deviates from the position, a phase of which is 90 degrees. However, an error relative to a correct position is extremely small. Accordingly, it is possible to obtain an approximate value of the correct position using the tenth equation. Nevertheless, if a more exact value is required, it is also possible to determine an exact value of $t_p$ by calculation.

In this manner, a value of the vector $e_2$ may also be determined by calculation. However, in order to shorten calculation time, that is to say, time required for distance measuring, and in order to simplify calculation processing, the first peak value $e_p$ of an oscillation waveform may also be adopted as a value of the vector $e_2$ just as it is. In this case, however, a slight error is produced as compared with a case where a value of the vector $e_2$ is determined by calculation.

From $n_2$, vector $e_2$ and $\beta$, which have been determined as above, a value of $\theta$ can be determined using the sixth equation.

An exact distance with a smaller measurement error can be calculated by correcting the distance obtained by the distance measuring by a distance corresponding to the angle $\theta$, which has been determined by the method described above.

An embodiment of the present invention will be described with reference to drawings.

Figure 1:
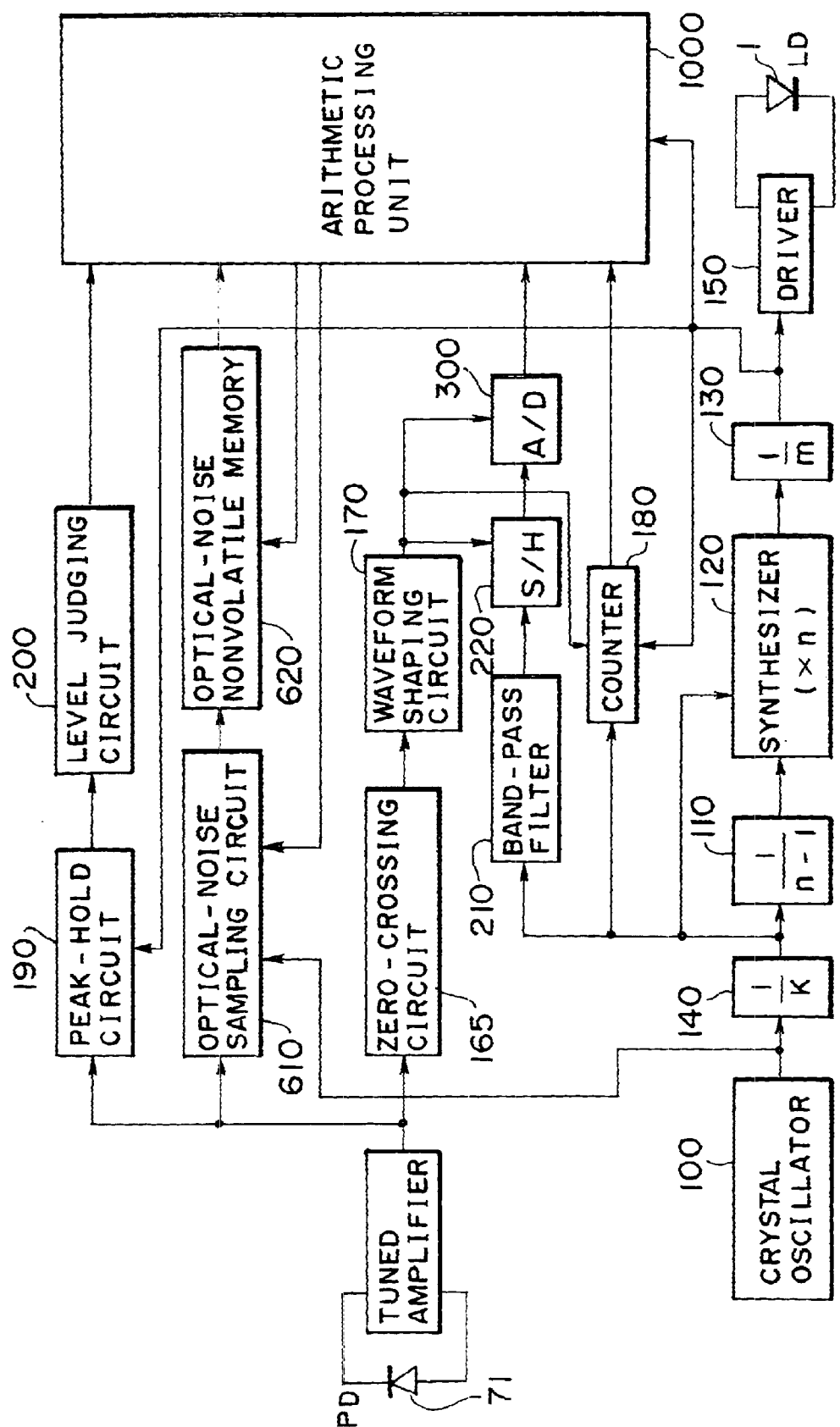
FIG. 1 is a diagram illustrating an electric configuration of an embodiment according to the present invention.

As shown in FIG. 1, this embodiment includes a crystal oscillator 100, a first frequency divider 110, a synthesizer 120, a second frequency divider 130, a third frequency divider 140, a luminous element 1, a luminous element driver 150, a light receiving element 71, an amplifier 160, a zero-crossing detecting circuit 165, a waveform shaping circuit 170, a counter 180, a peak-hold circuit 190, a level judging circuit 200, a band-pass filter 210, a sample hold (S/H) 220, an arithmetic processing circuit 1000, an optical-noise sampling circuit 610, and an optical-noise nonvolatile memory 620.

The processing circuit 1000 comprises a CPU, and a memory means. A phase measuring device 10000 comprises the arithmetic processing unit 1000, and an AD converter 300.

The crystal oscillator 100 is one of reference-signal generating means, and generates a reference signal. This reference signal is supplied to the third frequency divider 140, the first frequency divider 110, the synthesizer 120, the band-pass filter 210, and the counter 180. A frequency of the reference signal is divided into k equal parts (that is, 1/k) by the third frequency divider 140 before the reference signal is supplied to the first frequency divider 110. Then, the reference signal is divided into n−1 equal parts (that is, 1/(n−1)) by the first frequency divider 110 before the reference signal is transmitted to the synthesizer 120.

The synthesizer 120 multiplies the signal supplied from the first frequency divider 110 by n, and then transmits the multiplied signal to the second frequency divider 130. The second frequency divider 130 divides the signal supplied from the synthesizer 120 into m equal parts (1/m) to generate a measuring signal.

In addition, a laser diode driver 150 drives a pulse of a laser diode 1 according to the measuring signal which is an output signal of the second frequency divider 130.

It is to be noted that the measuring signal which is an output signal of the second frequency divider 130 is also supplied to the counter 180, the peak hold 190, and the arithmetic processing unit 1000 including the CPU. A judging signal becomes a light-emission acknowledgment signal for the arithmetic processing unit 1000, and also becomes a reference reset signal for the counter 180 and the peak hold 190.

An optical pulse emitted from a laser diode 1 passes through an optical system, and is then received by the light receiving element 71. The light receiving element 71 receives an optical pulse passing through an internal reference optical path, and an optical pulse passing through an external distance measurement optical path. The light receiving element 71 converts the optical pulse into an electric signal before transmitting the electric signal to the amplifier 160. The amplifier 160 is configured to amplify a signal inputted from the light receiving element 71 so that a damped oscillation waveform is formed, and to transmit the amplified signal to the zero-crossing detecting circuit 165. The zero-crossing detecting circuit 165 is configured to check light receiving by a threshold level (VS1 (reference level) shown in FIG. 2(b)), and to transmit a signal that is used to make the waveform shaping circuit 170 active.

Figure 2:
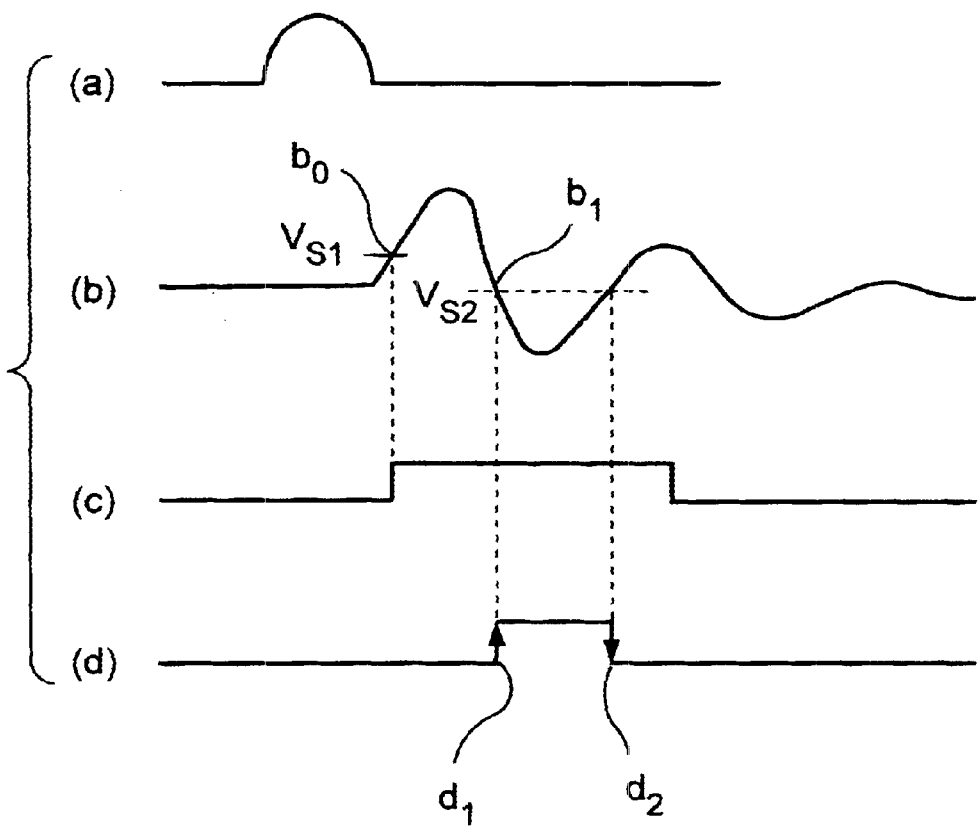
FIG. 2 is a diagram illustrating a threshold level.

At a threshold level (in proximity to VS2 (0 V) shown in FIG. 2(b)), the waveform shaping circuit 170 which has entered an active state obtains a light-receiving timing signal, a position of which is equivalent to the center of gravity of pulsed light. After that, the waveform shaping circuit 170 converts the light-receiving timing signal into binarized digital data, and then outputs the digital data to the counter 180, the sample hold (S/H) 220, and the AD converter 300.

The band-pass filter 210 forms a sine wave using a reference signal of the crystal oscillator 100, which is divided into k equal parts (1/k) by the third frequency divider 140, and then transmits the sine wave to the sample hold circuit 220. The sample hold circuit 220 samples and holds the sine wave using the timing signal of the waveform shaping circuit 170. A value which is held is analog-to-digital converted by the AD converter 300, and is then transmitted to the arithmetic processing unit 1000.

The arithmetic processing unit 1000 is devised to compare the held value with a pulse signal to judge whether or not the held value is an appropriate pulse signal, and to output an digital output, which is stored beforehand, in response to a situation if it is not an appropriate pulse signal.

In response to the pulse signal, the zero-crossing detecting circuit 165 makes a value of the threshold level VS1 variable. If the held value is an appropriate pulse signal, the converted digital data is successively stored in a memory area, indicated by a predetermined address, in the arithmetic processing unit 1000.

In addition, a peak value of the quantity of outside light is found by making the threshold level VS1 variable. This enables processing and correction in response to the quantity of light.

It is so devised that a sine wave obtained by the band-pass filter 210 slightly deviates from a light-emission frequency of the laser diode 1. Thus, a phase of the sine wave obtained by the band-pass filter 210 also slightly deviates from a phase of a receive timing signal in like manner. For example, as the relation between the phases, one hundred times forms one period. Accordingly, an output signal of the sample hold (S/H) 220 at about 100 MHz makes one period.

As described above, a waveform which is output from the sample hold circuit 220 is repeated at intervals of the given wave number, and digital data on a light-emission pulse basis is analog-to-digital converted before the data is stored in a memory of the arithmetic processing unit 1000.

To be more specific, when storing the data in the memory after the analog-to-digital conversion, sorting of the data generates analog-to-digital converted data which is a sine wave. Moreover, averaging the data which has been repeatedly added in a given cycle enables an improvement in accuracy of converted data.

It is to be noted that distance measuring is classified into rough measurement and accurate measurement. The rough measurement calculates a distance by counting the number of clocks between light-emission and light-receiving timing signals, which are output from the waveform shaping circuit 170.

The accurate measurement calculates a distance from a phase determined by the Fourier transform, according to analog-to-digital converted data stored in the memory.

Figure 3:
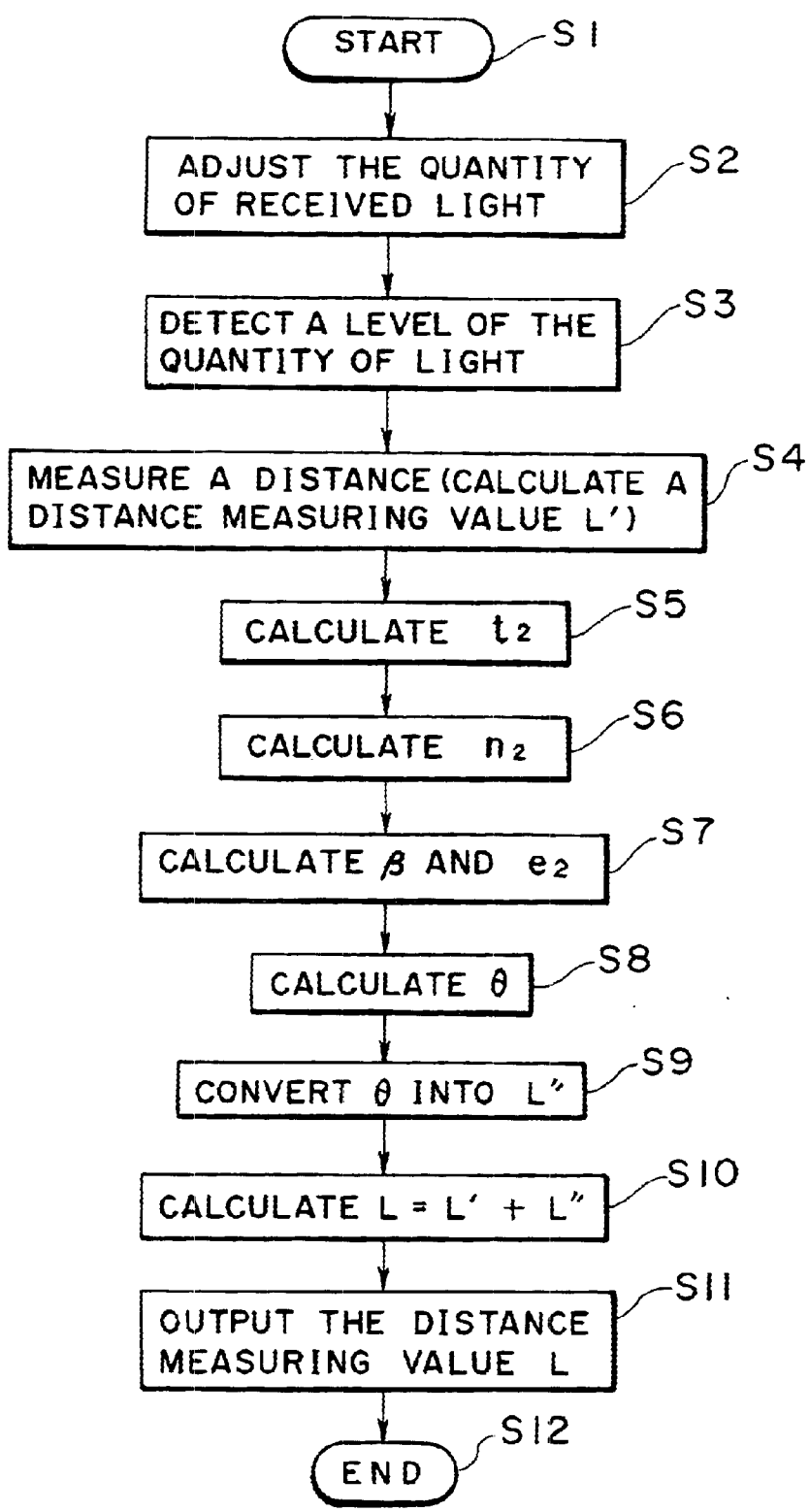
FIG. 3 is a flowchart illustrating the operation of this embodiment.

The operation of the above-mentioned embodiment will be described with reference to the flowchart of FIG. 3.

To begin with, in step 1 (hereinafter, step is abbreviated as S), distance measuring starts. Next, in S2, the quantity of received light is adjusted. If the quantity of received light is large, it is possible to damp the quantity of incident light to the desired quantity of light using a proper density filter. In S3, a level of the quantity of received light for which the density filter is used is detected. Moreover, in S4, a light-wave rangefinder measures a distance L' to an object to be measured.

Next, in S5, a zero-crossing point $t_2$ of a waveform E(t) which is actually observed is calculated. Further, in S6, $n_2$ which is a size of optical noise $N(t_2)$ at time $t_2$ is determined. The time $t_2$ is time when an observed waveform E(t) which is actually observed crosses zero.

In S7, β which is a phase difference between the actually observed waveform E(t) and a damped oscillation waveform N(t) by noise light is calculated from the damped oscillation waveform N(t) by noise light. Moreover, $e_2$ which is a size of a vector e at time $t_2$ when the observed waveform E(t) crosses zero is calculated using the ninth equation.

Next, in S8, from $n_2$, vector $e_2$, and β which are determined in S6, S7, a value of θ is determined using the sixth equation. Here, a phase shift θ is equivalent to an error in distance measuring. In S9, the phase shift θ which is an error in distance measuring is converted into a distance L" as an error. Further, in S10, L which is a real distance value can be calculated from a distance L'+L". Then, in S11, the real distance value L obtained in the S10 is output, and the measurement ends in S12.

The present invention has a configuration as described above, and provides a distance measuring device that is characterized by the following: a light-emitting unit emits pulsed measuring luminous flux toward a target to be measured; a light receiving unit receives luminous flux reflected by the target to be measured, and then converts the luminous flux into an electric signal; a tuned amplifier converts the electric signal of the light receiving unit into a damped oscillation waveform; and an arithmetic processing means calculates a distance from a measuring position to a reflecting object on the basis of the damped oscillation waveform of the tuned amplifier.

Using the distance measuring device according to the present invention, an optical-noise sampling unit samples an optical noise produced in the distance measuring device, an optical-noise storage unit stores sampling data of the optical-noise sampling unit, an arithmetic processing means reduces a measurement error caused by the optical noise on the basis of the sampling data of the optical-noise storage unit, and thereby a distance, a measurement error of which is reduced, can be calculated effectively.

What is claimed is:

1. A light-wave rangefinder using a pulse method, comprising:

a light-emitting unit for emitting pulsed measuring luminous flux toward a target to be measured;

a light receiving unit for receiving the luminous flux reflected by the target to be measured, and converting the luminous flux into an electric signal;

a tuned amplifier for converting the electric signal of the light receiving unit into a damped oscillation waveform;

an arithmetic processing means for calculating a distance from a measuring position to a reflecting object on the basis of the damped oscillation waveform of the tuned amplifier;

an optical-noise sampling unit for sampling an optical noise produced in the light-wave rangefinder; and an optical-noise storage unit for storing sampling data of the optical-noise sampling unit;

wherein said arithmetic processing means reduces a measurement error caused by the optical noise on the basis of the sampling data of the optical-noise storage unit, and thereby calculates a distance, a measurement error of which is reduced.

2. A light-wave rangefinder using a pulse method according to claim 1, wherein said arithmetic processing means comprises:

a sampling unit for sampling a damped oscillation waveform of the tuned amplifier at given sampling intervals;

a storage unit for storing sampling data of the sampling unit; and a distance calculating unit for calculating a distance from a measuring position to a reflecting object on the basis of the sampling data of the storage unit, said sampling unit and said storage unit being also used as the optical-noise sampling unit and the optical-noise storage unit, respectively.

* * * * *